US008881983B2

(12) United States Patent
Havens et al.

(10) Patent No.: US 8,881,983 B2
(45) Date of Patent: Nov. 11, 2014

(54) OPTICAL READERS AND METHODS EMPLOYING POLARIZATION SENSING OF LIGHT FROM DECODABLE INDICIA

(75) Inventors: William H. Havens, Syracuse, NY (US); Ynjiun P. Wang, Cupertino, CA (US)

(73) Assignee: Honeywell International Inc., Fort Mill, SC (US)

( * ) Notice: Subject to any disclaimer, the term of this patent is extended or adjusted under 35 U.S.C. 154(b) by 288 days.

(21) Appl. No.: 13/324,197

(22) Filed: Dec. 13, 2011

(65) Prior Publication Data

US 2013/0146665 A1 Jun. 13, 2013

(51) Int. Cl.
*G06K 7/10* (2006.01)

(52) U.S. Cl.
USPC .......................................... 235/455; 235/454

(58) Field of Classification Search
USPC .......................... 235/454, 455, 461, 462, 472
See application file for complete search history.

(56) References Cited

U.S. PATENT DOCUMENTS

| | | | |
|---|---|---|---|
| 4,544,836 A | 10/1985 | Galvin et al. | |
| 5,019,699 A | 5/1991 | Koenck | |
| 5,149,948 A | 9/1992 | Chisholm | |
| 5,406,062 A | 4/1995 | Hasegawa et al. | |
| 5,504,367 A | 4/1996 | Arackellian et al. | |
| 5,541,419 A | 7/1996 | Aracellian | |
| 5,572,006 A | 11/1996 | Wang et al. | |
| 5,576,529 A | 11/1996 | Koenck et al. | |
| 5,591,955 A | 1/1997 | Laser | |
| 5,646,390 A | 7/1997 | Wang et al. | |
| 5,648,650 A | 7/1997 | Sugifune et al. | |
| 5,701,001 A | 12/1997 | Sugifune et al. | |
| 5,744,815 A | 4/1998 | Gurevich | |
| 5,756,981 A | 5/1998 | Roustaei et al. | |
| 5,784,102 A | 7/1998 | Hussey et al. | |
| 5,815,200 A | 9/1998 | Ju et al. | |
| 5,877,487 A | 3/1999 | Tani et al. | |
| 5,886,338 A | 3/1999 | Arackellian et al. | |
| 6,010,070 A | 1/2000 | Mizuochi et al. | |
| 6,230,975 B1 | 5/2001 | Colley et al. | |
| 6,254,003 B1 | 7/2001 | Pettinelli et al. | |
| 6,283,374 B1 | 9/2001 | Fantone et al. | |
| 6,347,163 B2 | 2/2002 | Roustaei | |
| 6,412,700 B1 | 7/2002 | Blake et al. | |
| 6,426,838 B1 | 7/2002 | Rudeen | |
| 6,669,093 B1 | 12/2003 | Meyerson et al. | |
| 6,695,209 B1 | 2/2004 | La | |
| 6,749,120 B2 | 6/2004 | Hung et al. | |
| 6,832,725 B2 | 12/2004 | Gardiner et al. | |
| 6,877,661 B2 | 4/2005 | Webb et al. | |

(Continued)

OTHER PUBLICATIONS

U.S. Appl. No. 13/174,333, filed Jun. 30, 2011.

(Continued)

*Primary Examiner* — Thien M Le
(74) *Attorney, Agent, or Firm* — Additon, Higgins & Pendleton, P.A.

(57) ABSTRACT

A method for decoding decodable indicia includes sensing the polarization of light from a plurality of orientations in connection with the decodable indicia, and controlling at least one of energizing an illumination subsystem based on the sensed polarization indicating a generally randomly polarized light, and inhibiting energization of the illumination subsystem based on the sensed polarization indicating a generally linearly polarized light. One or more images are captured, and an attempt is made to decode the decodable indicia using at least one of the one or more images.

32 Claims, 8 Drawing Sheets

(56) References Cited

U.S. PATENT DOCUMENTS

| | | |
|---|---|---|
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,186,968 B2 | 3/2007 | Raynor |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Mani |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 2002/0071076 A1* | 6/2002 | Webb et al. ................... 349/117 |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0163355 A1 | 7/2006 | Olmstead et al. |
| 2006/0202036 A1 | 9/2006 | Wang et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0090007 A1 | 4/2010 | Wang et al. |
| 2010/0108769 A1 | 5/2010 | Wang et al. |
| 2010/0147956 A1 | 6/2010 | Wang et al. |
| 2010/0253782 A1 | 10/2010 | Elazary |
| 2011/0049245 A1 | 3/2011 | Wang |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinsburg et al. |
| 2012/0153022 A1 | 6/2012 | Havens et al. |
| 2012/0193429 A1* | 8/2012 | Van Volkinburg et al. ... 235/470 |
| 2012/0268744 A1* | 10/2012 | Wolf et al. .................... 356/447 |

OTHER PUBLICATIONS

U.S. Appl. No. 13/309,195, filed Dec. 1, 2011.
U.S. Appl. No. 13/170,104, filed Jun. 27, 2011.
U.S. Appl. No. 13/324,197, filed Dec. 13, 2011.
U.S. Appl. No. 13/428,500, filed Mar. 23, 2012.
Van Volkinburg et al., U.S. Appl. No. 12/957,971, filed Dec. 1, 2010, entitled "Terminal With Screen Reading Mode".
Van Volkinburg et al., U.S. Appl. No. 13/017,926, filed Jan. 31, 2011, entitled "Terminal With Flicker-Corrected Aimer and Alternating Illumination".
Jovanouski et al., U.S. Appl. No. 12/981,793, filed Dec. 30, 2010, entitled "Terminal Having Illumination and Exposure Control".
Meier et al., U.S. Appl. No. 13/250,282, filed Sep. 30, 2011, entitled "Devices and Methods Employing Dual Target Auto Exposure".
B. Onat, et al. "Polarization Sensing with Resonant Cavity Enhanced Photodetectors," IEEE Journal of Selected Topics in Quantum Electronics, vol. 2, No. 1, pp. 135-140, (11-pages) Apr. 1996.

* cited by examiner

OPTICAL READERS AND METHODS EMPLOYING POLARIZATION SENSING OF LIGHT FROM DECODABLE INDICIA

FIELD OF THE INVENTION

The present invention relates in general to optical readers, and in particular for optical readers and methods employing polarization sensing of light from decodable indicia.

BACKGROUND OF THE INVENTION

Indicia reading terminals for reading decodable indicia are available in multiple varieties. For example, minimally featured indicia reading terminals devoid of a keyboard and display are common in point of sale applications. Indicia reading terminals devoid of a keyboard and display are available in the recognizable gun style form factor having a handle and trigger button that can be actuated by an index finger.

Indicia reading terminals having keyboards and displays are also available. Keyboard and display equipped indicia reading terminals are commonly used in shipping and warehouse applications, and are available in form factors incorporating a display and keyboard. In a keyboard and display equipped indicia reading terminal, a trigger button for actuating the output of decoded messages is typically provided in such locations as to either enable actuation by a thumb of an operator or in some cases also providing a handle and trigger button that can be actuated by the index finger.

Indicia reading terminals in a form devoid of a keyboard and display or in a keyboard and display equipped form are commonly used in a variety of data collection applications including point of sale applications, shipping applications, warehousing applications, security check point applications, and patient care applications, and personal use, common where keyboard and display equipped indicia reading terminal is provided by a personal mobile telephone having indicia reading functionality.

Some indicia reading terminals are adapted to read barcode symbols including one or more of one dimensional (1D) barcodes, stacked 1D barcodes, and two dimensional (2D) barcodes. Other indicia reading terminals are adapted to read optical character recognition (OCR) characters while still other indicia reading terminals are equipped to read barcode symbols, postal symbologies or other information bearing indicia.

Barcode symbols are typically disposed on a substrate such as paper. Recently, barcode symbols are now being displayed on a display screen. Attempts have been made to provide indicia reading terminals capable of reading barcodes on paper and barcodes displayed on a display screen. Liquid crystal displays (LCDs) typically employ one or more polarizers so that the light emitted from the display has a polarized orientation.

There is a need for further optical readers, and in particular for optical readers and methods employing polarization sensing of light from decodable indicia.

SUMMARY OF THE INVENTION

In a first aspect, the present invention provides an indicia reading terminal comprising an illumination subsystem, an imaging subsystem comprising an image sensor array and an imaging optics assembly operable for focusing an image onto the image sensor array, a polarization sensor, and a housing incorporating the illumination subsystem, the imaging subsystem, and the polarization sensor. The indicia reading terminal is adapted based on the polarization sensor to at least one of control the illumination subsystem and capture one or more images. The indicia reading terminal is operable to attempt to decode a decodable indicia using the one or more images.

In a second aspect, the present invention provides a method for decoding decodable indicia. The method includes sensing the polarization of light from a plurality of orientations in connection with the decodable indicia, and controlling at least one of energizing an illumination subsystem based on the sensed polarization indicating a generally randomly polarized light, and inhibiting energization of the illumination subsystem based on the sensed polarization indicating a generally linearly polarized light. One or more images are captured, and an attempt is made to decode the decodable indicia using at least one of the one or more images.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

Figure 1:
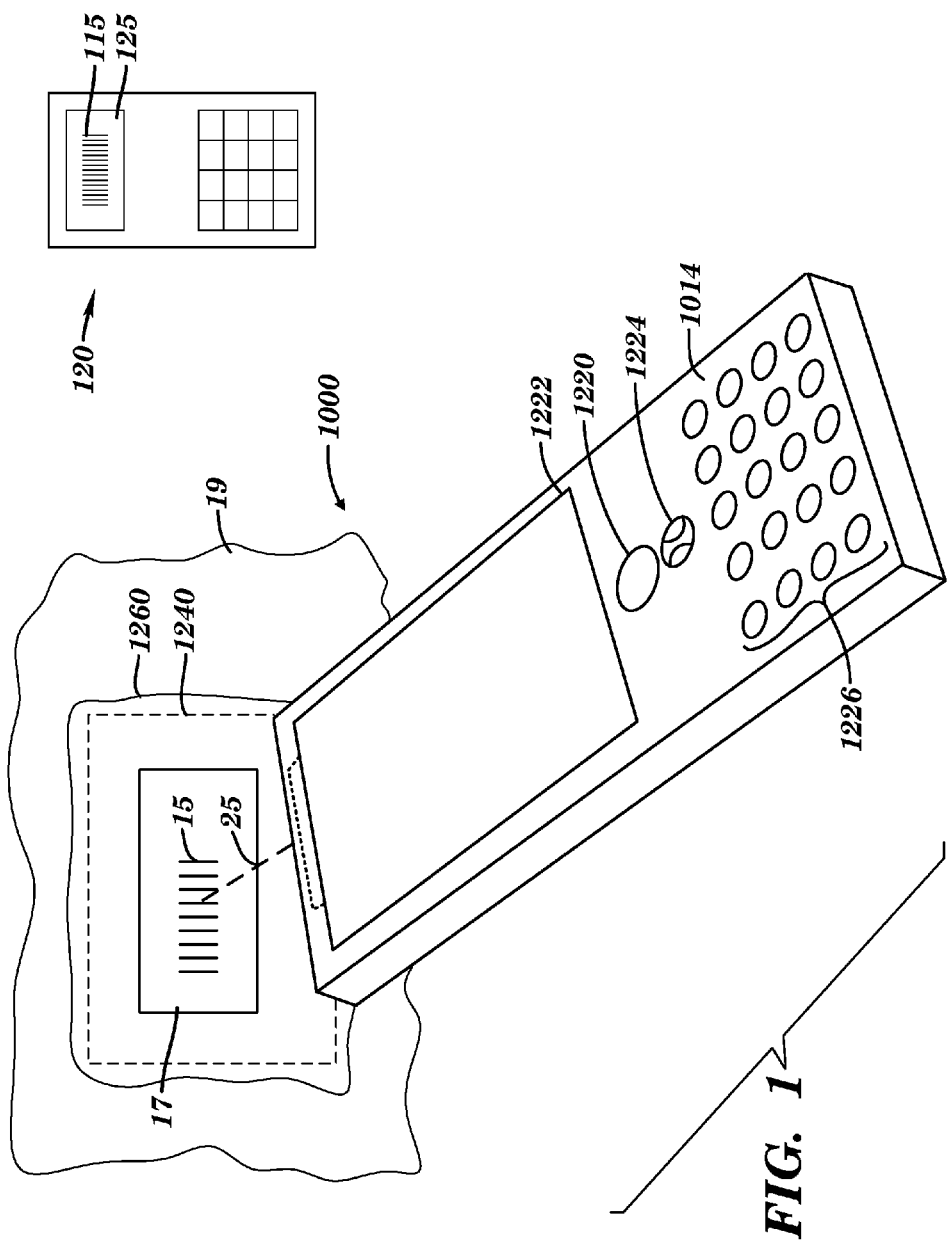
FIG. 1 is a schematic physical form view of one embodiment of an indicia reading terminal in accordance with an aspect of the present invention.

FIG. 1 illustrates one embodiment of an indicia reading terminal 1000 employing polarization sensing in accordance with an aspect of the present invention. For example, as explained in greater detail below, the polarization sensing may allow for tailoring operation of a light source employed for a) reading decodable indicia such as a barcode 15 disposed on a non-backlit substrate 17 such as paper, e.g., attached to a product 19, or device having an electronic paper display, and b) reading decodable indicia such as a barcode 115 displayed on an electronic device 120 such as a backlit screen 125, e.g., such as a display, monitor, LCD display, or other screen often employed in mobile phones, cell phones, satellite phones, smart phones, telemetric devices, personal data assistants, and other devices. Typically, light from a non-backlit substrate will be scattered and generally randomly polarized, while light emitted from a backlit screen will be generally linearly polarized.

Terminal 1000 in one embodiment may include a trigger 1220, a display 1222, a pointer mechanism 1224, and a keyboard 1226 disposed on a common side of a hand held housing 1014. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. Hand held housing 1014 of terminal 1000 can in another embodiment be devoid of a display and can be in a gun style form factor.

As described below, an illumination routine based on the polarization sensing may be employed for controlling the operation of a light source. For example, an indicia reading terminal may have a light source which is energized for emitting light or an illumination pattern where the light source is turned on, off, on, off, etc. By adapting the terminal so that, for example, prior to the indicia reading terminal obtaining one or more images of a barcode, the polarization of light from the barcode is sensed and employed for either controlling energizing the light source or inhibiting energization of the light source. The polarization sensing may be made active in response to activation of a trigger signal so that the indicia reading terminal may be rendered better suited for reading decodable indicia in an expanded range of operating environments. For example, if the decodable image is a non-backlit barcode on paper or electronic paper, an illumination routine may sense generally randomly polarized light and the light source will be energized to project light or an illuminated pattern onto the barcode. If the decodable image is a backlit barcode having its own illumination, the illumination routine may sense generally linearly polarized light and the light source will be inhibited from projecting light onto the barcode or use unilluminated portions of an illumination pattern projected onto the barcode.

The following description uses nomenclature associated with indicia reading terminals and may generally include hand held indicia reading terminals, fixed indicia reading terminals, however those of ordinary skill in the art will recognize that the present invention is applicable to a variety of other devices having a light source and imager which may be configured as, for example, mobile phones, cell phones, satellite phones, smart phones, telemetric devices, personal data assistants, and other devices.

Figure 2:
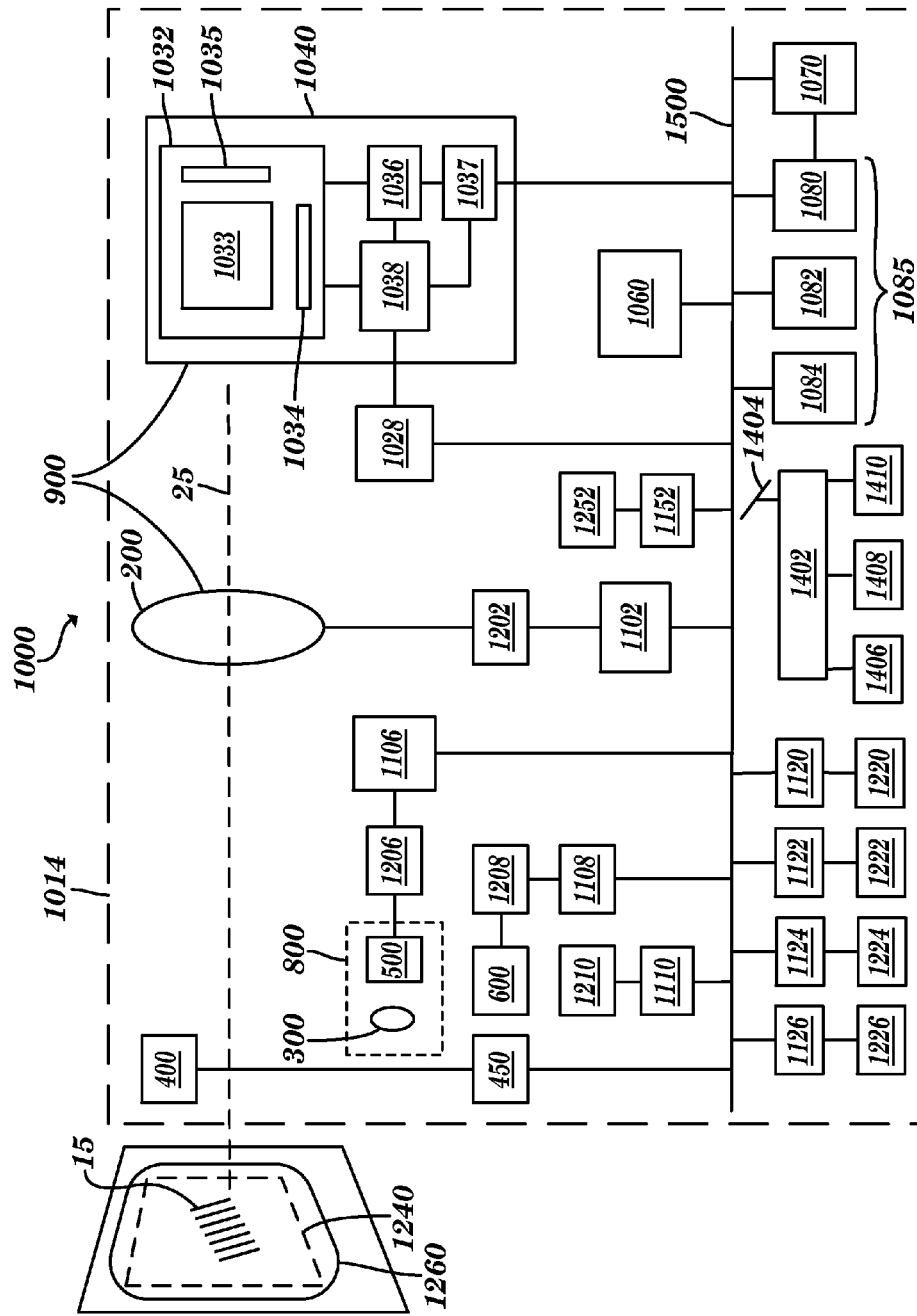
FIG. 2 is a block diagram of the indicia reading terminal of FIG. 1.

FIG. 2 depicts a block diagram of one embodiment of indicia reading terminal 1000. Generally, indicia reading terminal 1000 may include a polarization sensor 400, an illumination subsystem 800, an imaging subsystem 900, hand held housing 1014, a memory 1085, and a processor 1060.

Polarization sensor 400 may be operable for sensing light from a non-backlit substrate or light from a backlit screen, and sense the polarization of the detected light. Polarization sensor 400 may be operably coupled to a system bus 1500 via an interface 450 for communication with processor 1060. Illumination subsystem 800 may be operable for projecting an illumination pattern 1260 (FIGS. 1 and 2) which may include the light source being turned on or off, or the Illumination subsystem being turned on, off, on, off, etc. Imaging subsystem 900 may include an image sensor array 1033 and an imaging optics assembly 200 operable for focusing an image onto the image sensor array 1033. Hand held housing 1014 may encapsulate illumination subsystem 800 and imaging subsystem 900, in this illustrative embodiment. Memory 1085 is capable of storing a frame of image data, in which the frame of image data may represent light incident on image sensor array 1033. Processor 1060 may be operable for controlling Illumination subsystem 800 and operable for addressing memory 1085 and processing the frames of image data, such as processing for attempting to decode decodable indicia represented in the image data.

Figure 3:
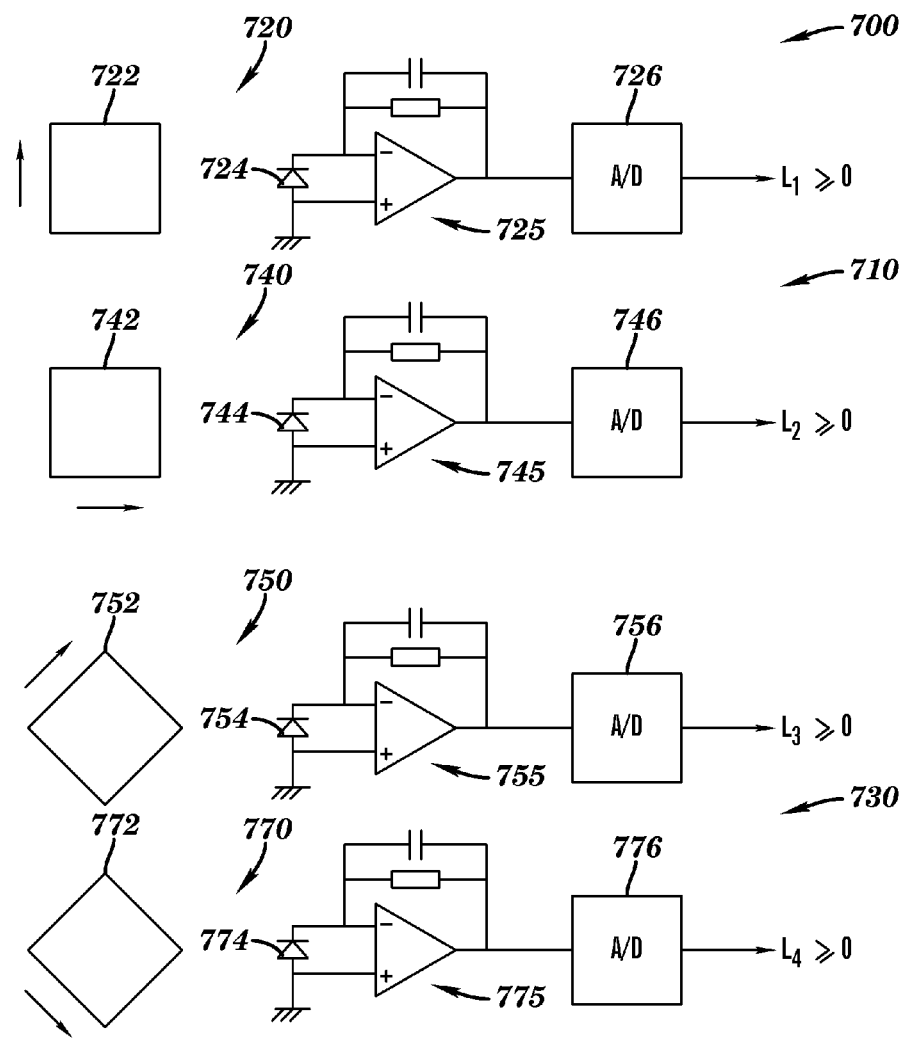
FIG. 3 is a schematic illustration of one embodiment of the polarization sensor for use in the indicia reading terminal of FIG. 1.

FIG. 3 illustrates one embodiment of a polarization sensor for use in the indicia reading terminal 1000 (FIGS. 1 and 2). For example, a polarization sensor 700 may be operable to sense from a plurality of different orientations, the polarization of light from decodable indicia such as decodable indicia disposed on a non-backlit substrate, or decodable indicia displayed on a backlit screen or display.

Polarization sensor 700 may include a first sensor 710 and a second sensor 730. In this exemplary embodiment, since the orientation of the polarization of light from a barcode is initially unknown, a first sensor and a second sensor may be disposed at about 45 degrees relative to each other to ensure that a suitable sensing and/or determination of the polarization of the light is obtained.

For example, first sensor 710 may include a first linear polarizer sensor 720 comprising a first polarizer 722 and a first light detector 724 located behind the first polarizer 722, and a second linear polarizer sensor 740 comprising a second polarizer 742 and a second light detector 744 located behind the second polarizer 742. First polarizer 722 may be rotated or disposed 90 degrees relative to second polarizer 742. First light detector 724 may be operably connected to a transimpedance amplifier 725 that converts current to voltage, and the voltage output may be directed to an analog to digital (A/D) converter 726 for producing a first signal L1. Second light detector 744 may be operably connected to a transimpedance amplifier 745 that converts current to voltage, and the voltage output may be directed to an analog to digital (A/D) converter 746 for producing a second signal L2.

Second sensor 730 may include a third linear polarizer sensor 750 comprising a third polarizer 752 and a third light detector 754 located behind the third polarizer 752, and a fourth linear polarizer sensor 770 comprising a fourth polarizer 772 and a fourth light detector 774 located behind the fourth polarizer 772. Third polarizer 752 may be rotated or disposed 90 degrees relative to fourth polarizer 772. Third light detector 754 may be operably connected to a transimpedance amplifier 755 that converts current to voltage, and the voltage output may be directed to an analog to digital (A/D) converter 756 for producing a third signal L3. Fourth light detector 774 may be operably connected to a transimpedance amplifier 775 that converts current to voltage, and the voltage output may be directed to an analog to digital (A/D) converter 776 for producing a fourth signal L4. Second sensor 730 may be rotated 45 degrees relative to first sensor 710. Light sensors 724, 744, 754, and 774 together with their associated transimpedance amplifiers 725, 745, 755, and 775 are designed so that a monotonic increase in light results in positive directed monotonic increase in output signal level, thus signals L1, L2, L3, and L4 will be equal to or greater than 0.

With reference again to first sensor 710, if the ratio R1 of the two signals L1 and L2 (e.g., R1=L1/L2) is close to about 1.0 then the light may not be polarized, and if the ratio R1 is smaller than about 0.8 or larger than about 1.25, then the light may be polarized. Similarly, with reference again to second sensor 730, if the ratio R2 of the two signals L3 and L4 (e.g., R2=L3/L4) is close to about 1.0 then the light may not be polarized, and if the ratio R2 is smaller than about 0.8 or larger than about 1.25, then the light may be polarized.

When attempting to decode a decodable indicia by positioning the indicia reading terminal 1000 (FIG. 1) adjacent to a decodable indicia, if the polarization sensor results in the ratios being greater than about 0.8 and less than 1.25, such as illustrated below:

$$0.8 < R1 < 1.25$$

and $$0.8 < R2 < 1.25$$

then the light is randomly polarized and the light source is energized. Otherwise the incident light is polarized and the light source is not turned on. For example, in the case where polarized light detected by first sensor 710 is disposed at a 45 degree angle relative to first polarizer 722 and second polarizer 742, the ratio of R1 would be about 1. However, the ratio of R2, resulting from the polarized light detected by the second sensor 730, would be less than 0.8 or greater than 1.25 indicating that the light is not randomly polarized. It will be appreciated that processor 1060 may be operable to process the signals regarding polarization and determine whether the light is randomly polarized or linearly polarized. It will also be appreciated that polarization sensor 700 may include processing capabilities to process the signals regarding polarization and determine whether the light is randomly polarized or linearly polarized.

Other polarization sensors may be suitably employed in the indicia reading terminal in accordance with the present invention. For example, the polarization sensitive solid state image sensor disclosed in U.S. Pat. No. 7,186,968 issued to Raynor, and the resonant enhanced photodetectors disclosed in the journal article by Onat and Unlu, entitled "Polarization Sensing with Resonant Cavity Enhanced Photodetectors", the entire contents of the application and journal article being incorporated herein by reference.

In the situation when the user positions the indicia reading terminal not at a decodable indicia but such as upwardly in the air or downwardly toward the ground, and pulls the trigger, it is likely that the determined polarization will be a random polarization. In another aspect of the present invention, indicia reading terminal 1000 (FIG. 1) may be operable to compare the signal strength of the light detectors to a predetermined value to determine whether the indicia reading terminal is or is not pointed at a decodable indicia. For example, one or more of signals L1, L2, L3, and L4 may have a value between a range, for example, between 55 and 255 counts from an 8-bit A/D converter 726, 746, 756, and 776. If at least one of the signals has a value greater than or equal to 55, then it is likely that the light detected is from a decodable indicia. Otherwise, if all of the signal values are outside the range, e.g., less than 55, it is likely that the detected light is not from a decodable indicia or likely considered as an undecodable image.

Figure 4:
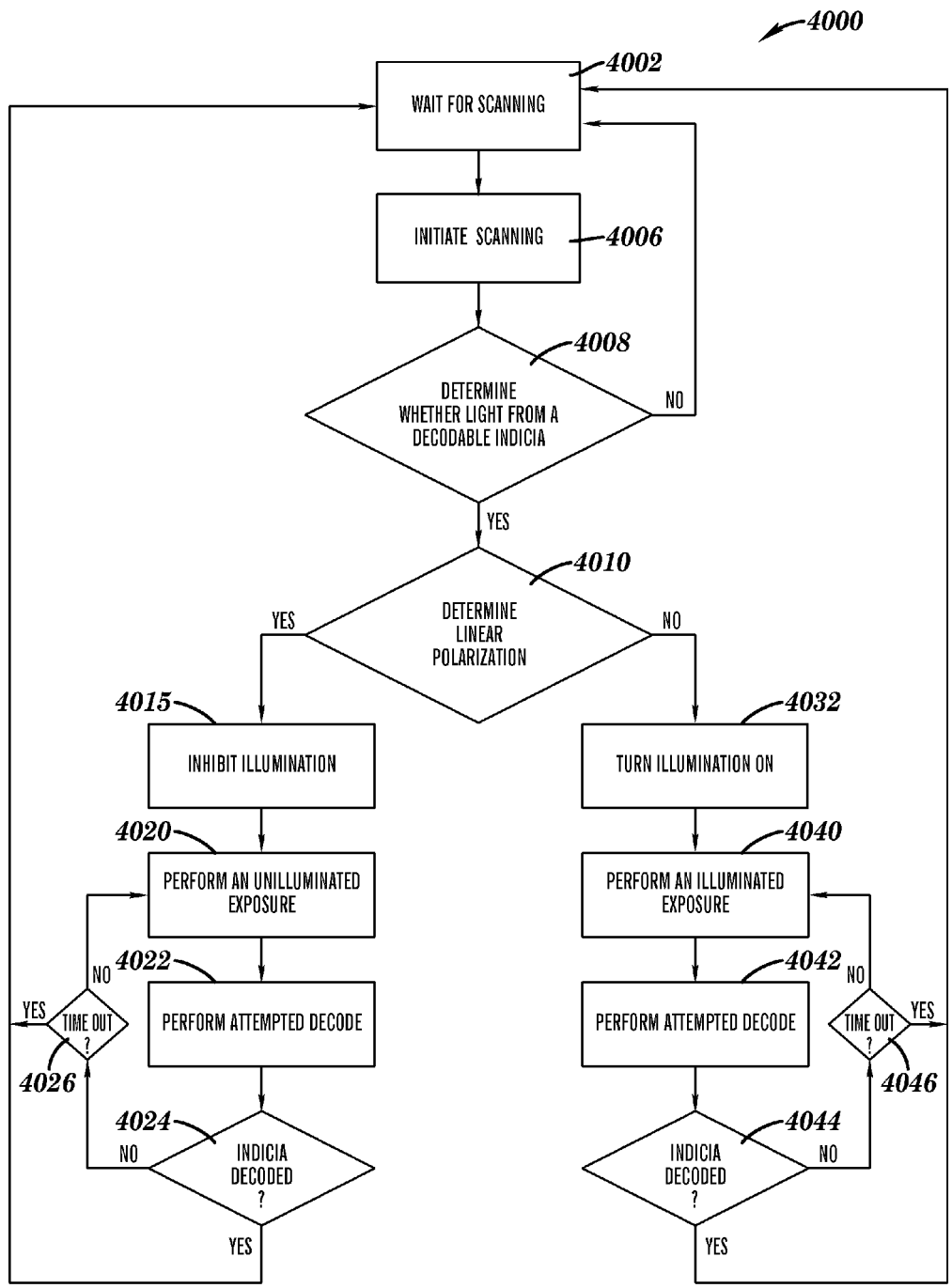
FIG. 4 is a flowchart illustrating one embodiment of a method for decoding a decodable indicia using the indicia reading terminal of FIG. 1.

FIG. 4 illustrates a flowchart of an embodiment of a method 4000 for decoding decodable indicia in accordance with an aspect of the present invention. For example, method 4000 may be employed for decoding a non-backlit decodable indicia such as a barcode disposed on a non-backlit substrate, or employed for decoding a backlit decodable indicia such as a barcode disposed on a display.

At 4002, terminal 1000 (FIG. 1) may wait for scanning to be initiated and at 4006, scanning may be initiated, e.g., by activation of a trigger signal via actuation of trigger 1220 (FIG. 1). A trigger signal can also be activated, e.g., via object detection, or a serial command from an external computer.

At 4008, a determination is made whether the light is from a decodable indicia, e.g., if the value or signal strength corresponds to a predetermined value or strength or falls within a predetermined range. If not, the process ends and terminal 1000 (FIG. 1) waits for the next scan.

If it is determined that the light is from a decodable indicia, terminal 1000 (FIG. 1) senses polarization at 4010, for example, as described above. If linear polarization is detected at 4010, the light source is not turned on at 4015, and an unilluminated exposure is performed at 4020, e.g., a capture of a frame of image data or a series of frames of image data during the unilluminated exposure. At 4022, an attempted decode of the image data or series of image data is performed. At 4024, if decoding fails or is not successful, and a time out counter has not been reached at 4026, another unilluminated exposure (e.g., a capture of a frame of image data or a series of frames of image data during the unilluminated exposure) is performed at 4020, and another attempted decode is performed at 4022. If decoding is successful at 4024, the process ends and terminal 1000 (FIG. 1) waits for the next scan. If at 4026, the attempted decode is not successful and a time out counter has been reached, terminal 1000 (FIG. 1) waits for the next scan.

If linear polarization is not detected at 4010, illumination is turned on at 4032, and an illuminated exposure is performed at 4040, e.g., a capture of a frame of image data or a series of frames of image data during the illuminated exposure. At 4042, an attempted decode of the image data or series of image data is performed. At 4044, if decoding fails or is not successful, and a time out counter has not been reached at 4046, another illuminated exposure (e.g., a capture of a frame of image data or a series of frames of image data during the illuminated exposure) is performed at 4040, and another attempted decode is performed at 4042. If decoding is successful at 4044, the process ends and terminal 1000 (FIG. 1) waits for the next scan. If at 4046, the attempted decode is not successful and a time out counter has been reached, terminal 1000 (FIG. 1) waits for the next scan.

For example, if the decodable image is a barcode disposed on a non-backlit substrate such as paper or electronic paper, the captured images with the illumination on during the exposure window may be better suited for reading and/or decoding the barcode. If the decodable image is a barcode displayed on a backlit display having its own illumination, the captured images without illumination during the exposure window may be better suited for reading and/or decoding the barcode. By performing the initial polarization sensing, terminal 1000 (FIG. 1) may improve or optimize its performance in reading both non-backlit barcodes and backlit barcodes. For example, by first determining whether the barcode employs its own illumination, terminal 1000 (FIG. 1) may quickly capture images without illumination, and avoid using the light source.

Figure 5:
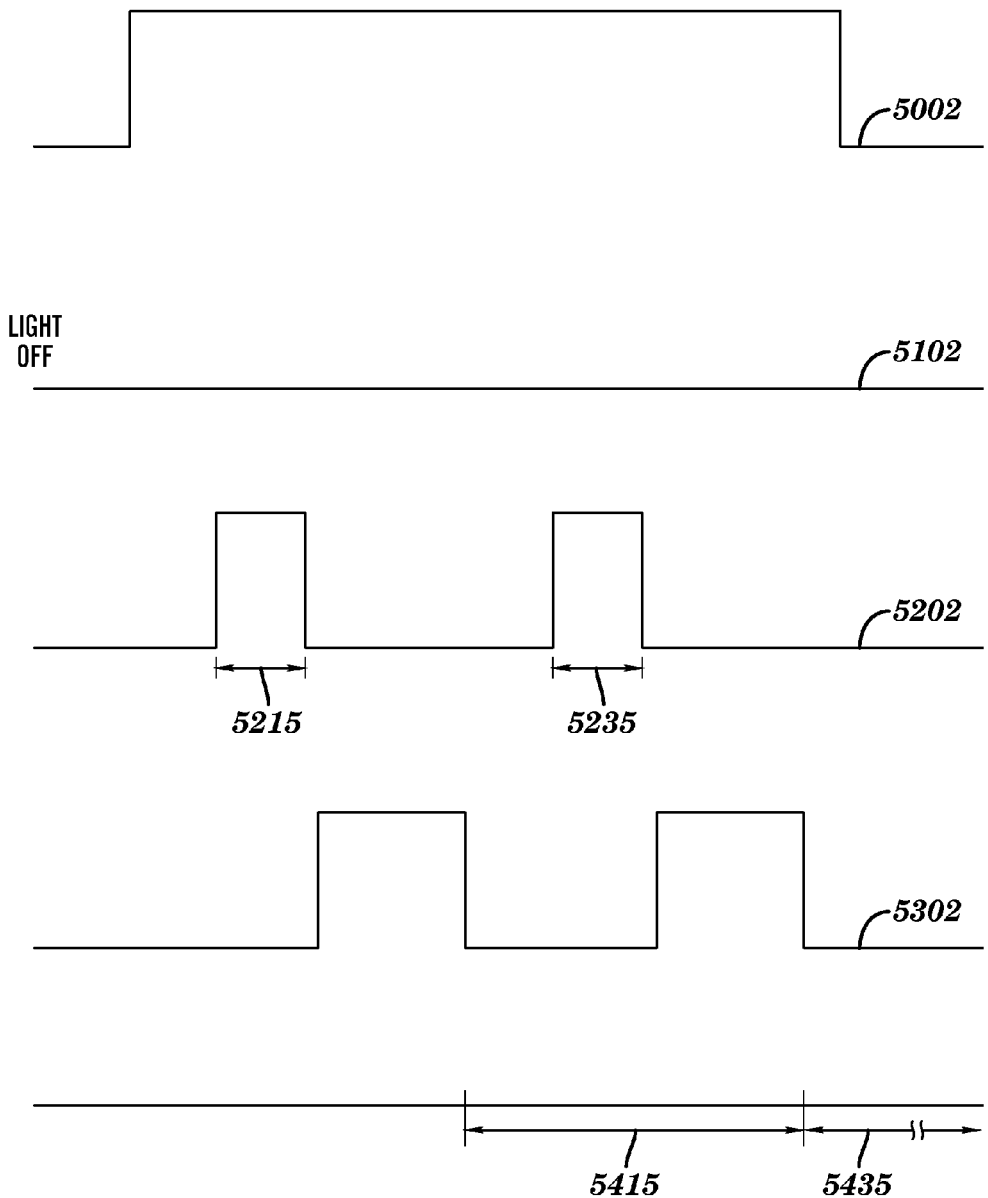
FIG. 5 is a timing diagram illustrating one embodiment for decoding a decodable indicia disposed on a backlit screen performed by the indicia reading terminal of FIG. 1.
Figure 6:
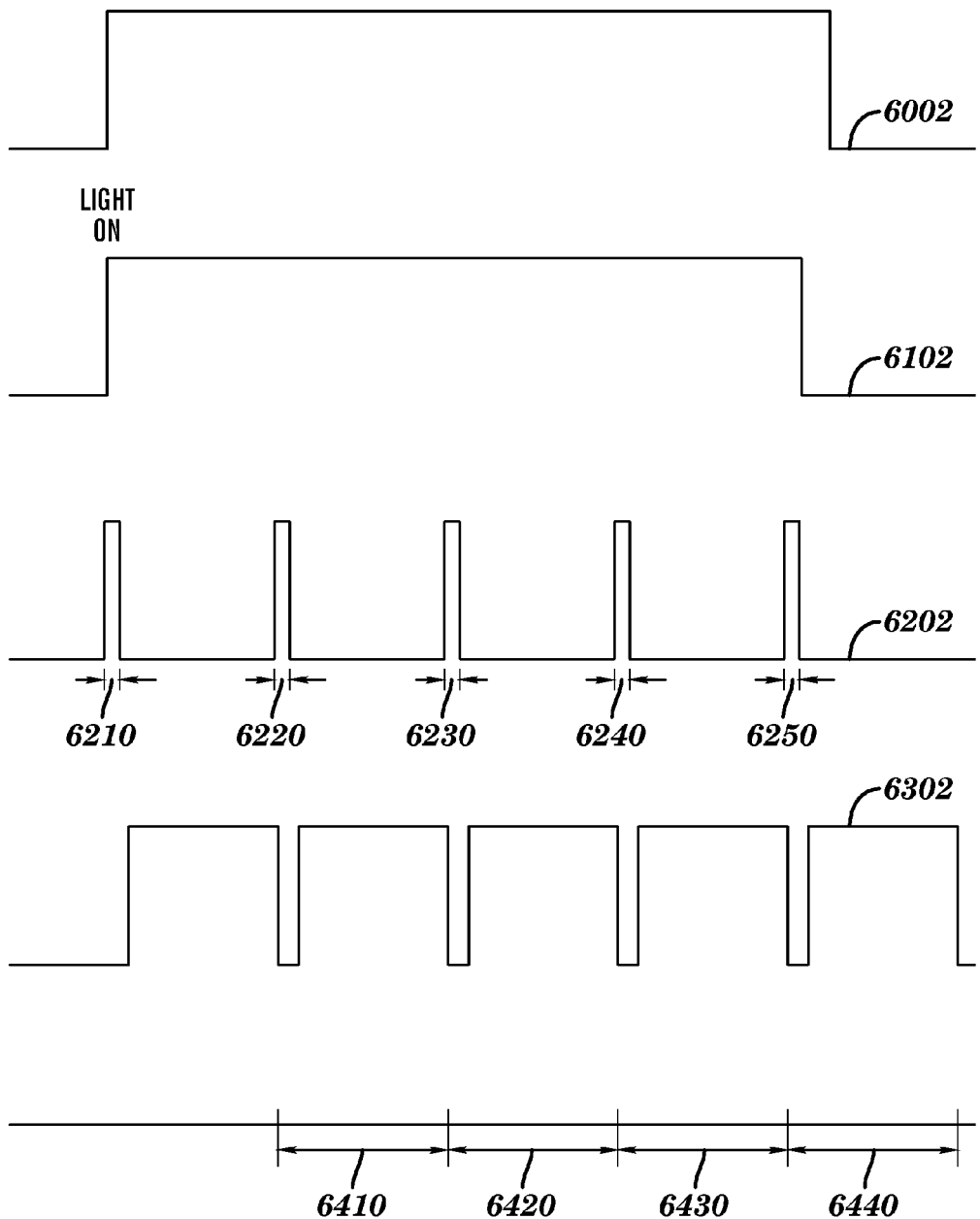
FIG. 6 is a timing diagram illustrating one embodiment for decoding a decodable indicia disposed on a non-backlit substrate performed by the indicia reading terminal of FIG. 1.

FIGS. 5 and 6 illustrate two timing diagrams in connection with operation of the terminal 1000 (FIG. 1) during performance of the method indicated by the flowchart as shown in FIG. 4. For example, terminal 1000 (FIG. 1) may be operable so that no illumination is provided as shown in FIG. 5 where a linearly polarized backlit display is detected, and where a continuous illumination may be provided as shown in FIG. 6 where a randomly polarized display is detected.

With regard to FIG. 5, the timing diagram of FIG. 5 may be employed for when a decodable indicia having a backlit display is detected, e.g., linearly polarized light is sensed. For example, a signal 5002 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

Upon detection that the light from a decodable indicia is a linearly polarized light, a signal 5102 illustrates illumination subsystem 800 (FIG. 2) having an inactive energization level, e.g., illustrating illumination or light not being turned on. A signal 5202 is an exposure control signal illustrating active states defining exposure periods and inactive states intermediate the exposure periods for the image sensor of the terminal. For example, in an active state, an image sensor array of terminal 1000 (FIG. 1) is sensitive to light incident thereon. Exposure control signal 5202 can be applied to an image sensor array of terminal 1000 so that pixels of an image sensor array are sensitive to light during active periods of the exposure control signal and not sensitive to light during inactive periods thereof. During exposure periods 5215 and 5235, the image sensor array of terminal 1000 (FIG. 1) is sensitive to light incident thereon while the illumination subsystem is inactive, e.g., the illumination subsystem is off.

A signal 5302 is a readout control signal illustrating the exposed pixels in the image sensor array being transferred to memory or secondary storage in the imager so that the imager may be operable to being ready for the next active portion of the exposure control signal. In the timing diagram of FIG. 5, periods 5415 and 5435 are periods in which processer 1060 (FIG. 2) can process one or more frames of image data. For example, periods 5415 and 5435 may correspond to one or more attempts to decode decodable indicia in which the image resulted during periods when indicia reading terminal 1000 (FIG. 1) was not illuminating the decodable indicia.

With reference to FIG. 6, the timing diagram of FIG. 6 may be employed for when a decodable indicia disposed on a substrate is detected, e.g., randomly polarized light is sensed. For example, a signal 6002 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

Upon detection that the light from a decodable indicia is randomly polarized, a signal 6102 illustrates illumination subsystem 800 (FIG. 2) having an active energization level, e.g., illustrating illumination or light being turned on. A signal 6202 is an exposure control signal illustrating active states defining exposure periods and inactive states intermediate the exposure periods for an image sensor of a terminal. For example, in an active state, an image sensor array of terminal 1000 (FIG. 1) is sensitive to light incident thereon. Exposure control signal 6202 can be applied to an image sensor array of terminal 1000 (FIG. 1) so that pixels of an image sensor array are sensitive to light during active periods of the exposure control signal and not sensitive to light during inactive periods thereof. During exposure periods 6210, 6220, 6230, and 6240, the image sensor array of terminal 1000 is sensitive to light incident thereon.

A signal 6302 is a readout control signal illustrating the exposed pixels in the image sensor array being transferred to memory or secondary storage in the imager so that the imager may be operable to being ready for the next active portion of the exposure control signal. In the timing diagram of FIG. 6, periods 6410, 6420, 6430, 6440, and 6450 are periods in which processer 1060 (FIG. 2) may process one or more frames of mage data when indicia reading terminal 1000 (FIG. 1) was illuminating the decodable indicia.

Figure 7:
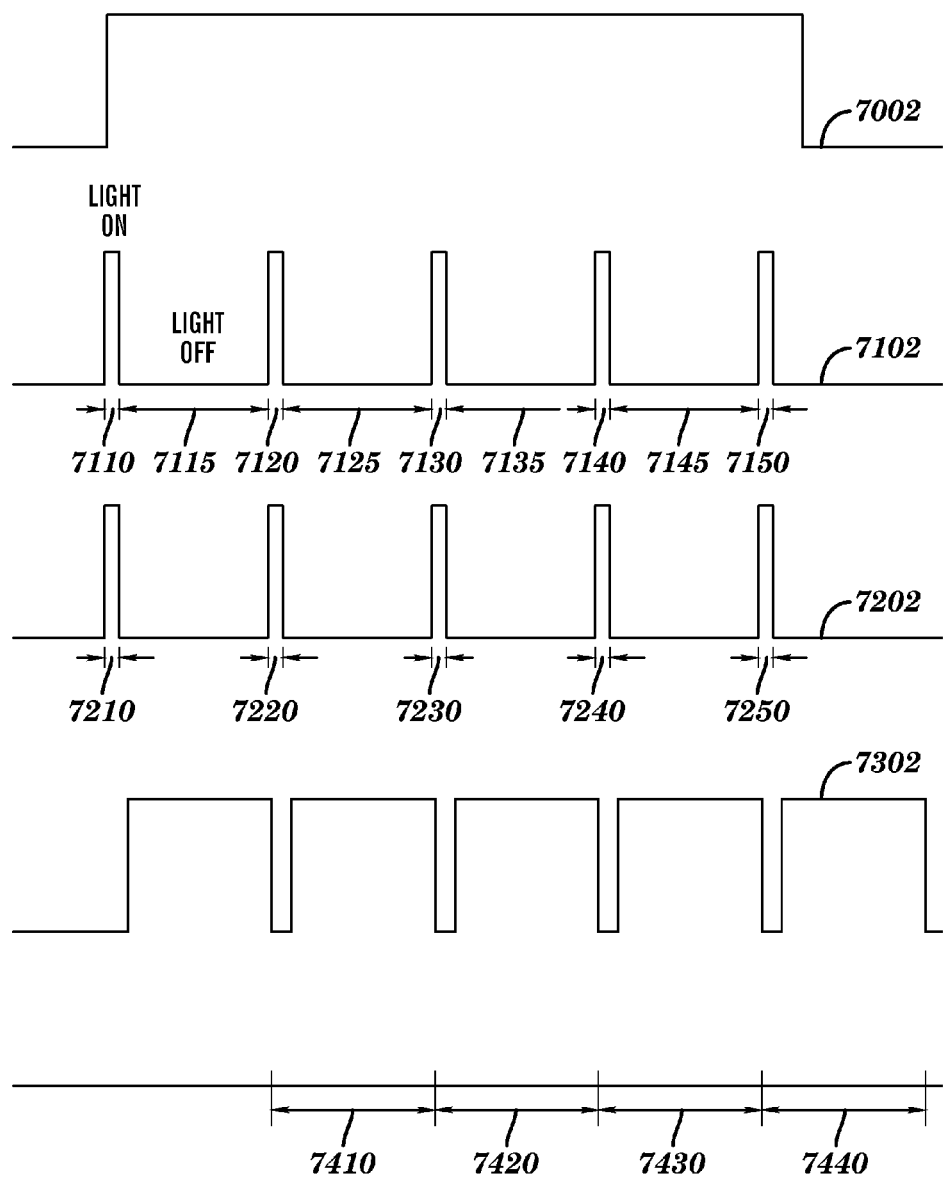
FIG. 7 is a timing diagram illustrating another embodiment for decoding a decodable indicia disposed on a non-backlit substrate performed by the indicia reading terminal of FIG. 1.
Figure 8:
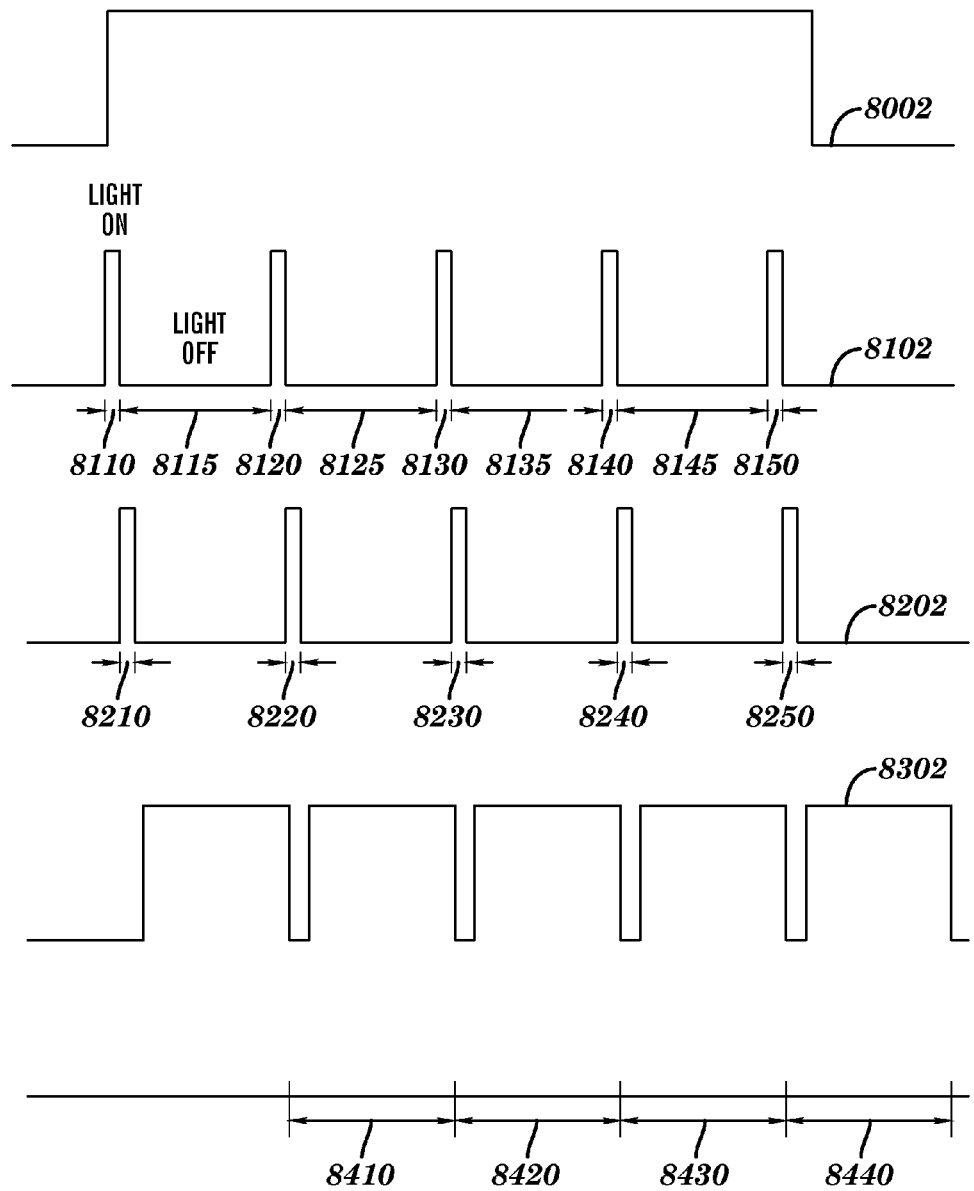
FIG. 8 is a timing diagram illustrating another embodiment for decoding a decodable indicia disposed on a backlit screen performed by the indicia reading terminal of FIG. 1.

FIGS. 7 and 8 illustrate another two timing diagrams in connection with operation of the terminal 1000 (FIG. 1) during performance of the method indicated by the flowchart as shown in FIG. 4. For example, terminal 1000 (FIG. 1) may be operable so that an illumination pattern, where illumination or light is alternatively turned on and off, may be provided for use when either a linearly polarized backlit display is sensed as shown in FIG. 7 or a randomly polarized display is sensed as shown in FIG. 8.

With reference to FIG. 7, the timing diagram of FIG. 7 may be employed for when a decodable indicia disposed on a substrate is sensed, e.g., randomly polarized light is sensed. For example, a signal 7002 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

Upon detection that the light from a decodable indicia is randomly polarized light, a signal 7102 illustrates illumination subsystem 800 (FIG. 2) having an energization level, e.g., illustrating an illumination pattern where illumination or light is alternatively turned on and off. Periods 7110, 7120, 7130, 7140, and 7150 illustrate where illumination is on, and periods 7115, 7125, 7135, and 7145 illustrate where illumination is off.

A signal 7202 is an exposure control signal illustrating active states defining exposure periods and inactive states intermediate the exposure periods for an image sensor of a terminal. For example, in an active state, an image sensor array of terminal 1000 (FIG. 1) is sensitive to light incident thereon. Exposure control signal 7202 can be applied to an image sensor array of terminal 1000 (FIG. 1) so that pixels of an image sensor array are sensitive to light during active periods of the exposure control signal and not sensitive to light during inactive periods thereof. During exposure periods 7210, 7220, 7230, 7240, and 7250, the image sensor array of terminal 1000 (FIG. 1) is sensitive to light incident thereon.

A signal 7302 is a readout control signal illustrating the exposed pixels in the image sensor array being transferred to memory or secondary storage in the imager so that the imager may be operable to being ready for the next active portion of the exposure control signal. In the timing diagram of FIG. 7, periods 7410, 7420, 7430, 7440, and 7450 are periods in which processer 1060 (FIG. 2) may process one or more frames of image data. For example, periods 7410, 7420, 7430, and 7440 may correspond to one or more attempts to decode decodable indicia in which the image resulted during periods when indicia reading terminal 1000 (FIG. 1) was illuminating the decodable indicia.

With reference to FIG. 8, the timing diagram of FIG. 8 may be employed for when a decodable indicia having a backlit display is detected, e.g., linearly polarized light is sensed. For example, a signal 8002 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

Upon detection that the light from a decodable indicia is linearly polarized light, a signal 8102 illustrates illumination subsystem 800 (FIG. 2) having an energization level, e.g., illustrating an illumination pattern where illumination or light is being alternatively turned on and off. Periods 8110, 8120, 8130, 8140, and 8150 illustrate where illumination is on, and periods 8115, 8125, 8135, and 8145 illustrate where illumination is off.

A signal 8202 is an exposure control signal illustrating active states defining exposure periods and inactive states intermediate the exposure periods for an image sensor of a terminal. For example, in an active state, an image sensor array of terminal 1000 (FIG. 1) is sensitive to light incident thereon. Exposure control signal 8202 can be applied to an image sensor array of terminal 1000 (FIG. 1) so that pixels of an image sensor array are sensitive to light during active periods of the exposure control signal and not sensitive to light during inactive periods thereof. During exposure periods 8210, 8220, 8230, 8240 and 8250, the image sensor array of terminal 1000 (FIG. 1) is sensitive to light incident thereon which occurs when the light source or illumination subsystem is off.

A signal 8302 is a readout control signal illustrating the exposed pixels in the image sensor array being transferred to memory or secondary storage in the imager so that the imager may be operable to being ready for the next active portion of the exposure control signal. In the timing diagram of FIG. 8, periods 8410, 8420, 8430, and 8440 are periods in which processer 1060 (FIG. 2) may process one or more frames of image data. For example, periods 8410, 8420, 8430, and 8440 may correspond to one or more attempts to decode decodable indicia in which the image resulted during periods when indicia reading terminal 1000 (FIG. 1) was not illuminating the decodable indicia.

With reference again to FIG. 2, indicia reading terminal 1000 may include an image sensor 1032 comprising multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components. Image sensor integrated circuit 1040 including image sensor array 1033 and imaging lens assembly 200 can be incorporated in hand held housing 1014.

In one example, image sensor integrated circuit 1040 can be provided e.g., by an MT9V022 (752×480 pixel array) or an MT9V023 (752×480 pixel array) image sensor integrated circuit available from Micron Technology, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminal 1000 can include image sensor 1032 and lens assembly 200 for focusing an image onto image sensor array 1033 of image sensor 1032.

In the course of operation of terminal 1000, image signals can be read out of image sensor 1032, converted, and stored into a system memory such as RAM 1080. Memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Reference still to FIG. 2 and referring to further aspects of terminal 1000, imaging lens assembly 200 can be adapted for focusing an image of decodable indicia 15 located within a field of view 1240 (FIGS. 1 and 2) on a substrate or on a screen onto image sensor array 1033. A size in target space of a field of view 1240 of terminal 1000 can be varied in a number of alternative ways. A size in target space of a field of view 1240 can be varied, e.g., by changing a terminal to target distance, changing an imaging lens assembly setting, changing a number of pixels of image sensor array 1033 that are subject to read out. Imaging light rays can be transmitted about an imaging axis 25. Lens assembly 200 can be adapted to be capable of multiple focal lengths and multiple planes of optimum focus (best focus distances).

Terminal 1000 may include illumination subsystem 800 for illumination of target, and projection of illumination pattern 1260. Illumination subsystem 800 may emit light having a random polarization. Illumination pattern 1260, in the embodiment shown can be projected to be proximate to but larger than an area defined by field of view 1240, but can also be projected in an area smaller than an area defined by a field of view 1240. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with processor 1060.

In one embodiment, illumination subsystem 800 may include, in addition to light source bank 500, an illumination lens assembly 300, as is shown in the embodiment of FIG. 2. In addition to or in place of illumination lens assembly 300, illumination subsystem 800 can include alternative light shaping optics, e.g. one or more diffusers, mirrors and prisms. In use, terminal 1000 can be oriented by an operator with respect to a target, (e.g., a piece of paper, a package, another type of substrate, screen, etc.) bearing decodable indicia 15 in such manner that illumination pattern 1260 is projected on decodable indicia 15. In the example of FIG. 2, decodable indicia 15 is provided by a 1D barcode symbol. Decodable indicia 15 could also be provided by a 2D barcode symbol or optical character recognition (OCR) characters. Referring to further aspects of terminal 1000, lens assembly 200 can be controlled with use of an electrical power input unit 1202 which provides energy for changing a plane of optimum focus of lens assembly 200. In one embodiment, electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. A light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include a power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Further, regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a barcode symbol, e.g., a one dimensional barcode symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various peripheral devices to system address/data bus (system bus) 1500, for communication with processor 1060 also coupled to system bus 1500. Terminal 1000 can include an interface circuit 1028 for coupling image sensor timing and control circuit 1038 to system bus 1500, an interface circuit 1102 for coupling electrical power input unit 1202 to system bus 1500, an interface circuit 1106 for coupling illumination light source bank power input unit 1206 to system bus 1500, and an interface circuit 1120 for coupling trigger 1220 to system bus 1500. Terminal 1000 can also include display 1222 coupled to system bus 1500 and in communication with processor 1060, via an interface 1122, as well as pointer mechanism 1224 in communication with processor 1060 via an interface 1124 connected to system bus 1500. Terminal 1000 can also include keyboard 1226 coupled to systems bus 1500 and in communication with processor 1060 via an interface 1126. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels or ranges of pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. An indicia reading terminal comprising:
an illumination subsystem;
an imaging subsystem comprising an image sensor array and an imaging optics assembly operable for focusing an image onto said image sensor array;
a polarization sensor;
a housing incorporating said illumination subsystem, said imaging subsystem, and said polarization sensor;
wherein said indicia reading terminal is adapted based on said polarization sensor to at least one of control said illumination subsystem and capture one or more images;
wherein said indicia reading terminal is operable to attempt to decode a decodable indicia using the one or more images; and
wherein said polarization sensor is operable to provide a plurality of signals regarding polarization of light from a plurality of different orientations, and said indicia reading terminal is adapted based on at least one ratio of the plurality of signals being equal to about 1 to control said illumination subsystem to energize said illumination subsystem and capture the one or more images, and being less than about 0.8 or greater than about 1.2 to control said illumination subsystem to inhibit energization of said illumination subsystem and capture the one or more images.

2. The indicia reading terminal of claim 1 wherein said indicia reading terminal is adapted based on said polarization sensor to energize said illumination subsystem and capture the one or more images, and wherein said indicia reading terminal being operable to attempt to decode the decodable indicia comprises said indicia reading terminal being operable to attempt to decode a non-backlit decodable indicia using the one or more images.

3. The indicia reading terminal of claim 1 wherein said indicia reading terminal is adapted based on said polarization sensor to inhibit energization of said illumination subsystem and capture the one or more images, and wherein said indicia reading terminal being operable to attempt to decode the decodable indicia comprises said indicia reading terminal being operable to attempt to decode a backlit decodable indicia using the one or more images.

4. The indicia reading terminal of claim 1 wherein said indicia reading terminal is adapted to activate said polarization sensor prior to said indicia reading terminal being operable to attempt to decode the decodable indicia.

5. The indicia reading terminal of claim 1 wherein the illumination subsystem is operable to emit light comprising a random polarization.

6. The indicia reading terminal of claim 1 wherein said polarization sensor is operable to provide a plurality of signals regarding polarization of light from a plurality of different orientations, and wherein said indicia reading terminal being adapted based on the plurality of signals to effect the at least one of the control said illumination subsystem and the capture one or more images.

7. The indicia reading terminal of claim 1 wherein said polarization sensor is operable to provide a plurality of signals regarding polarization of light from a plurality of different orientations, and said indicia reading terminal is adapted based on a comparison of the plurality of signals to effect the at least one of the control said illumination subsystem and capture the one or more images.

8. The indicia reading terminal of claim 1 wherein said polarization sensor is operable to provide a plurality of signals regarding polarization of light from a plurality of different orientations, and said indicia reading terminal is adapted based on at least one ratio of the plurality of signals to effect the at least one of the control said illumination subsystem and capture the one or more images.

9. The indicia reading terminal of claim 1 wherein said polarization sensor is operable to provide a first plurality of signals regarding polarization of light from a first plurality of different first orientations, and provide a second plurality of signals regarding polarization of light from a second plurality of different second orientations wherein said first orientations is different from said second orientations, and wherein said indicia reading terminal is adapted, based on a first ratio of said first plurality of signals being greater than about 0.8 and less than about 1.2, and a second ratio of said second plurality of signals being greater than about 0.8 and less than about 1.2 to control said illumination subsystem to energize said illumination subsystem and capture the one or more images.

10. The indicia reading terminal of claim 9 wherein said polarization sensor comprises a first light sensor disposed behind said first linear polarizer and a second light sensor disposed behind said second linear polarizer.

11. The indicia reading terminal of claim 1 wherein said indicia reading terminal is adapted, based on said polarization sensor and likelihood of not sensing light from a decodable indicia, to inhibit capturing one or more images.

12. The indicia reading terminal of claim 1 wherein said polarization sensor comprises a first linear polarizer and a second linear polarizer disposed 90 degrees relative to each other.

13. The indicia reading terminal of claim 1 wherein said polarization sensor comprises a first set of linear polarizers comprising a first linear polarizer and a second linear polarizer disposed about 90 degrees relative to each other, and a second set of linear polarizers comprising a third linear polarizer and a fourth linear polarizer disposed about 90 degrees relative to each other, and wherein said first set of linear polarizers and said second set of linear polarizers are disposed about 45 degrees relative to each other.

14. The indicia reading terminal of claim 13 wherein said polarization sensor comprises a first light sensor disposed behind said first linear polarizer, a second light sensor disposed behind said second linear polarizer, a third light sensor disposed behind said third linear polarizer, and a fourth light sensor disposed behind said fourth linear polarizer.

15. The indicia reading terminal of claim 14 wherein said polarization sensor is operable to provide a first plurality of signals regarding polarization of light from a first plurality of different first orientations, and provide a second plurality of signals regarding polarization of light from a second plurality of different second orientations wherein said first orientation is different from said second orientation, and wherein said indicia reading terminal is adapted, based on a first ratio of said first plurality of signals being greater than about 0.8 and less than about 1.2 and a second ratio of said second plurality of signals being greater than about 0.8 and less than about 1.2 to control said illumination subsystem to energize said illumination subsystem and capture the one or more images.

16. The indicia reading terminal of claim 1 wherein said indicia reading terminal is operable to attempt to decode the decodable indicia comprising a barcode.

17. The indicia reading terminal of claim 1 wherein said indicia reading terminal comprises a hand held indicia reading terminal.

18. A method for decoding a decodable indicia, the method comprising:
 sensing the polarization of light from a plurality of orientations in connection with the decodable indicia;
 controlling at least one of energizing an illumination subsystem based on the sensed polarization indicating a generally randomly polarized light, and inhibiting energization of the illumination subsystem based on the sensed polarization indicating a generally linearly polarized light;
 capturing one or more images, and
 attempting to decode the decodable indicia using at least one of the one or more images;
 wherein the sensing comprises sensing the polarization of light from a plurality of different orientations in connection with the decodable indicia, and wherein the controlling comprises inhibiting energization of the illumination subsystem based on a ratio of the sensed polarization from the sensed polarization from the plurality of different orientations being less than about 0.8 or greater than about 1.2.

19. The method of claim 18 wherein the controlling comprises energizing the illumination subsystem based on the sensed polarization indicating the generally randomly polarized light, and the attempting to decode the decodable indicia comprises attempting to decode a non-backlit decodable indicia using the one or more images.

20. The method of claim 18 wherein the controlling comprises inhibiting energization of the illumination subsystem based on the sensed polarization indicating the generally linearly polarized light, and the attempting to decode the decodable indicia comprises attempting to decode a backlit decodable indicia using the one or more images.

21. The method of claim 18 wherein the sensing the polarization of light from a plurality of orientations in connection with a decodable indicia is prior to the controlling the at least one of energizing an illumination subsystem based on the sensed polarization indicating a generally randomly polarized light, and inhibiting energization of the illumination subsystem based on the sensed polarization indicating a generally linearly polarized light.

22. The method of claim 18 wherein the controlling comprises controlling the energizing of the illumination subsystem to produce light having a random polarization.

23. The method of claim 18 wherein the sensing comprises sensing polarization of light from a plurality of different orientations in connection with the decodable indicia.

24. The method of claim 18 wherein the sensing comprises sensing the polarization of light from a plurality of different orientations in connection with the decodable indicia, and comparing the sensed polarizations.

25. The method of claim 18 wherein the sensing comprises sensing the polarization of light from a plurality of different orientations in connection with the decodable indicia, and wherein the controlling comprises energizing the illumination subsystem based on a ratio of the sensed polarization from the plurality of different orientations being equal to about 1.

26. The method of claim 18 wherein the sensing comprises sensing the polarization of light from a first plurality of different first orientations, and sensing polarization of light from a second plurality of different second orientations wherein the first orientations is different from the second orientations.

27. The method of claim 18 further comprising inhibiting capture of one or more images based on a likelihood that light from the plurality of orientations is not in connection with a decodable indicia.

28. A method for decoding decodable indicia, the method comprising:
 providing the indicia reading terminal of claim 1 comprising the polarization sensor and the illumination subsystem;
 sensing the polarization of light from a plurality of orientations from the decodable indicia;
 controlling at least one of energizing the illumination subsystem based on the sensed polarization indicating a generally randomly polarized light, and inhibiting energization of the illumination subsystem based on the sensed polarization indicating a generally linearly polarized light;
 capturing one or more images, and
 attempting to decode at least one of decodable indicia using at least one of the one or more images.

29. The method of claim 28 wherein the polarization sensor comprises a first set of linear polarizers comprising a first linear polarizer and a second linear polarizer disposed about 90 degrees relative to each other, and a second set of linear polarizers comprising a third linear polarizer and a fourth linear polarizer disposed about 90 degrees relative to each other, and wherein the first set of linear polarizers and the second set of linear polarizers are disposed about 45 degrees relative to each other.

30. The method of claim 29 wherein the polarization sensor comprises a first light sensor disposed behind the first linear polarizer, a second light sensor disposed behind the second linear polarizer, a third light sensor disposed behind the third linear polarizer, and a fourth light sensor disposed behind the fourth linear polarizer.

31. The method of claim 28 wherein the decodable indicia comprises a barcode.

32. The method of claim 28 wherein the indicia reading terminal comprises a hand held indicia reading terminal.

* * * * *